(12) United States Patent
Timmons, Jr.

(10) Patent No.: US 6,320,513 B1
(45) Date of Patent: Nov. 20, 2001

(54) DIRTY FILTER INDICATOR

(76) Inventor: Ronald G. Timmons, Jr., 7799 SE. 64th St., Newberry, FL (US) 32669

( * ) Notice: Subject to any disclaimer, the term of this patent is extended or adjusted under 35 U.S.C. 154(b) by 0 days.

(21) Appl. No.: 09/659,563

(22) Filed: Sep. 11, 2000

(51) Int. Cl.$^7$ .................................................. G08B 21/00
(52) U.S. Cl. .................. 340/607; 340/384.1; 340/404.1; 116/70
(58) Field of Search ................................. 340/607, 384.1, 340/404.1; 116/67 R, 70; 96/419

(56) References Cited

U.S. PATENT DOCUMENTS

| | | |
|---|---|---|
| 2,753,831 | 7/1956 | Davies . |
| 4,321,070 | 3/1982 | Bede . |
| 4,747,364 | 5/1988 | Horowitz . |
| 5,057,821 | 10/1991 | Card . |
| 5,325,809 | 7/1994 | Mulle, Jr. . |
| 5,352,255 | 10/1994 | Taft . |
| 5,772,711 | 6/1998 | Kieffer . |

Primary Examiner—Julie Lieu
(74) Attorney, Agent, or Firm—Richard C. Litman

(57) ABSTRACT

A dirty filter indicator device adapted for use with a furnace, an air conditioning assembly and the like. As the filter collects dirt and dust, the overall airflow is restricted causing more air to flow through the whistle device. This increased air flow through the device alerts the occupants to the need to change the air filter. The device has a canopy cover to prevent large dust particles from clogging the device and an adjustable nozzle element which can be adjusted to begin whistling according to the degree of dirtiness of the filter by cutting portions of the distal end of the whistle.

4 Claims, 3 Drawing Sheets

DIRTY FILTER INDICATOR

BACKGROUND OF THE INVENTION

1. Field of the Invention

The present invention relates generally to a noise producing device responsive to air flow. More specifically, the invention is a reusable filter whistle adjustable in the degree of sensitivity to airflow permitted before whistling and adapted for use with a furnace or an air conditioning assembly in any position.

2. Description of the Related Art

The related art of interest in a crowded art describes various indicator devices, but none discloses the present invention. There is a need for a utilitarian, ergonomic and inexpensive warning device adjustable in sensitivity to add to a filter to indicate the filter is dirty and requires replacement. The related art will be described in the order of perceived relevance to the present invention.

U.S. Pat. No. 4,321,070, issued on Mar. 23, 1982 to James D. Bede, describes a simple two-piece reusable plastic whistle installed in a gridded fiberglass air filter to signal a predetermined 60–70% clogged air filter. The whistle has two circular molded plastic parts which interfit as follows. The upstream part is cup-shaped with a flange for compressing the filter's grid and a tubular lip surrounding the bottom wall of the first part. The bottom wall of the cup has an orifice which is aligned with an orifice in a recessed portion of the downstream whistle part. The flanged portion of the downstream part interfits with the lip of the upstream part. A typical rated flow resistance of a new filter is about 0.02 inch $H_2O$. At a pressure drop of 0.23 to 0.25 inch $H_2O$, the whistle will emit a soft tone. At 0.5 inch $H_2O$, the whistle will emit a loud shrill tone. The viscous throw-away filter is replaced. A dry type reusable filter can be shaken or vacuumed. The whistle device is distinguishable for its two-part construction requiring alignment of the two orifices.

U.S. Pat. No. 2,753,831, issued on Jul. 10, 1956 to Walter B. Davies, describes an air filter clogging warning apparatus comprising a whistle inserted in a filter. The whistle apparatus is configured as a hollow capsule, the whistle, per se, being a double-walled device having aligned holes, the whistle being positioned in a tube with a funnel-shaped entrance between the funnel portion and a tubular neck portion having a diameter two hundred times larger than the holes. The whistle apparatus is distinguishable for its funnel structure with a double-walled whistle.

U.S. Pat. No. 5,352,255, issued on Oct. 4, 1994 to Andrew A. Taft, describes a noise maker for an air filter comprising a permanently coupled rectangular housing with two aligned holes and having a weighted member in resilient relationship over one hole in the housing. The weighted member is slidably mounted on a dowel rod within the housing. A slider plate is provided with a plurality of hole sizes and interposed between one hole and the weighted member. The device is distinguishable for its multiple parts and intricate structure.

U.S. Pat. No. 5,057,821, issued on Oct. 15, 1991 to Gary C. Card, describes a filter sentry apparatus which emits an audible alarm by actuating a switch within a housing. A housing secured to a filter web includes a reciprocating rod directed through the housing. When the filter web becomes plugged, the rod actuates a magnet to track a plurality of contacts of a switch to effect an audible and visual alarm. In addition, an on/off switch is provided. The apparatus is distinguishable for its electrical structure.

U.S. Pat. No. 5,325,809, issued on Jul. 5, 1994 to Theodore B. Mulle, Jr., describes a hair dryer with an alarm notifying the user of a clogged filter. A whistle containing a reed is centered in the air inlet of the hair dryer. The whistle is distinguishable for its required reed structure.

U.S. Pat. No. 5,772,711, issued on Jun. 30, 1998 to Joseph W. Kieffer, describes a filter blockage warning indicator for a portable turbine of a spray paint gun system. A visual indicator comprising a lamp is actuated by a predetermined filter blockage of 75%. An audible indicator in place of the visual indicator is coincidently described, but its structure is not explained.

U.S. Pat. No. 4,747,364, issued on May 31, 1988 to Barry N. Horowitz, describes a flow rate threshold sensor for use with an air filter which channels air flow to energize an audible sound generator upon development of an air pressure differential within the sensor above a settable threshold, resulting from a clogged air filter. The sensor includes a magnetically retained disk, which disk in combination with a cap of the sensor, defines a first chamber having an air pressure commensurate with that of the upstream side of an associated air filter. A second chamber defined by the disk and the base of the sensor is in fluid communication through an aperture in the base with the downstream side of the air filter to establish within the second chamber an air pressure with that present at the downstream side of the disk. Upon development of a sufficient pressure differential between the first and second chambers, the disk will be displaced from the magnet and permit air flow from the first chamber to the second chamber in response to the pressure differential. Air flow response means extend across the aperture in the base and become energized in response to air flow through the aperture to provide an audible tone indicative of the pressure differential threshold being exceeded. Means are provided to alter the degree of magnetic force acting upon the disk and to permit altering the threshold level. The sensor device is distinguishable for relying on a magnetic response.

None of the above inventions and patents, taken either singularly or in combination, is seen to describe the instant invention as claimed. Thus, a dirty filter indicator solving the aforementioned problems is desired.

SUMMARY OF THE INVENTION

The present invention is a one-piece reusable filter whistle device adapted for use in an air filter for a furnace, an air conditioning assembly and the like, the filter being positionable in any position, e.g., vertical, horizontal, upside down. As the filter collects dirt and dust, the airflow is restricted, causing more air to flow through the whistle device. This increased air flow through the device audibly alerts the occupants to the need to change the air filter. The whistle has a protective roof and an adjustable point at which the whistle will occur by checking the degree of dirtiness of the filter and cutting off a portion of the whistle to make the adjustment.

Accordingly, it is a principal object of the invention to provide a device warning occupants of a dwelling that an air filter needs replacement or cleaning.

It is another object of the invention to provide an economical and reusable one-piece warning device indicating a dirty filter.

It is a further object of the invention to provide an audible warning device adjustable in degree to indicate an air filter needs replacement.

Still another object of the invention is to provide a small warning device with a protective roof which can be placed in the air filter.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
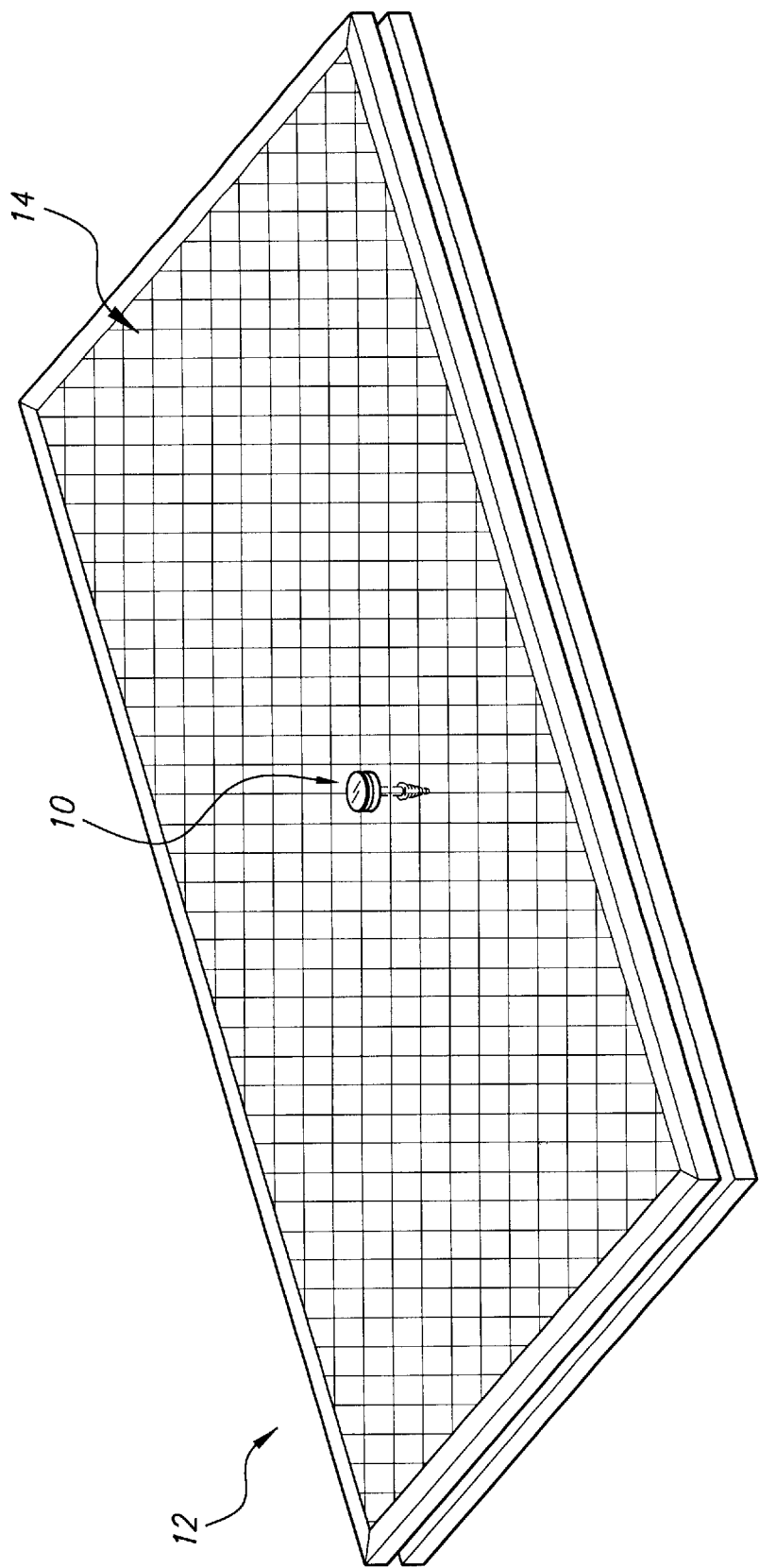
FIG. 1 is an environmental, perspective view of a dirty filter indicator device placed in a furnace filter according to the present invention.

The present invention to directed to a dirty filter indicator device 10 centered in an exemplary rectangular air filter 12 combination in FIG. 1 utilized in a furnace or an air conditioning unit. The air filter 12 can have a grid 14 of plastic or metal material on one or both sides for supporting the device 10.

Figure 2:
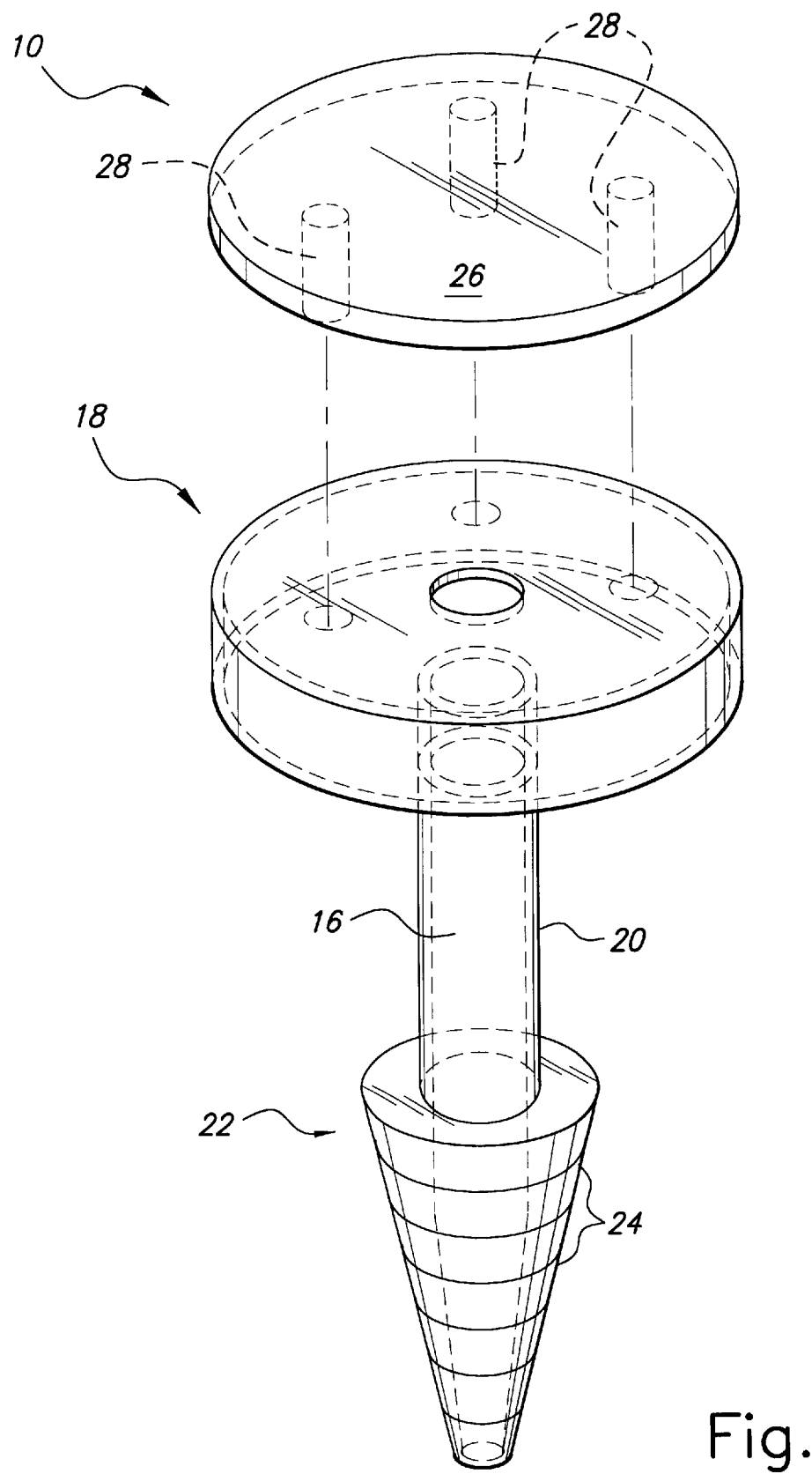
FIG. 2 is a partially exploded view of the one-piece dirty filter indicator device to show the connection of the cover and the cavity with the exposed.
Figure 3:
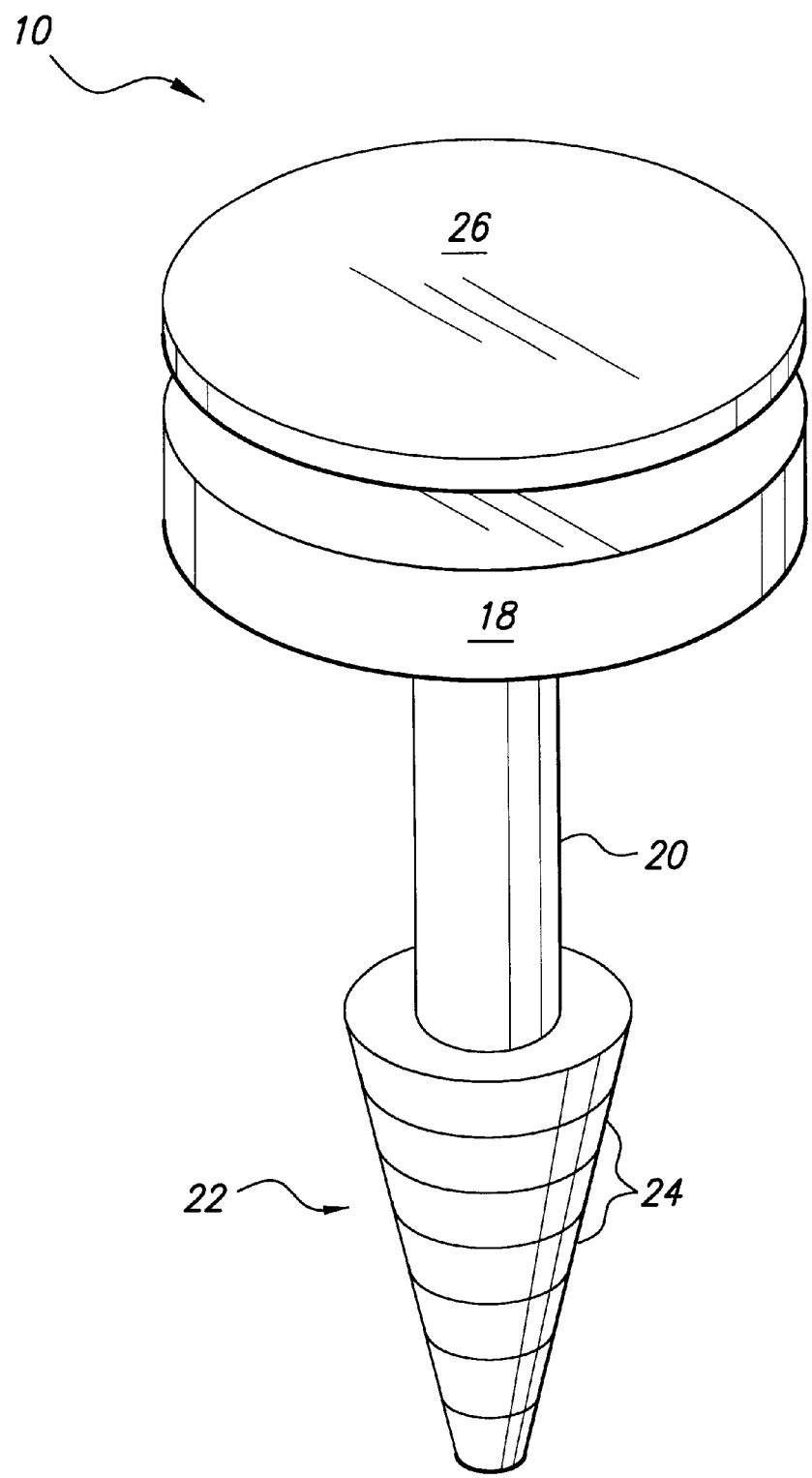
FIG. 3 is an elevational view of the one-piece dirty filter indicator device according to the present invention.

The one-piece whistle device 10 illustrated in a partially exploded format in FIG. 2 and integrated in FIG. 3 has a restricted longitudinal cavity 16 defined by tubular body portion 20, the cavity 16 decreasing in diameter approaching the distal end. An upper circular hollow flange 18 is formed on the upstream side of cavity 16. A cylindrical tubular body portion 20 projects approximately one-half of the vertical distance in the hollow flange 18. A truncated cone shaped nozzle portion 22 is formed on the downstream side of cavity 16, nozzle portion 22 consisting of a corrugated surface 24 decreasing in radius and adapted to securely remain in the air filter 12 under an airflow. The cover or roof 26 with tripod legs 28 is coextensive in diameter with the hollow flange 18. The whistle device 10 can be molded in one piece from recycled plastic.

The whistle 10 emits a warning sound by the increased airflow through the hollow flange portion 18 and restricted cavity 16 when the air filter 12 becomes overloaded with dirt and dust. The roof or cover 26 is essential in preventing large dust particles from clogging the whistle 10 and insuring an unobstructed airflow. Moveover, another important advantage is the use of the corrugated surface 24 of the nozzle portion 22 to permit the calibration of the airflow permitted by the whistle 10 to begin whistling by cutting off the end to adjust the point at which the whistle will occur to suit the home-owner or business owner.

It is to be understood that the present invention is not limited to the embodiment described above, but encompasses any and all embodiments within the scope of the following claims.

I claim:

1. A dirty filter indicator device and an air filter combination comprising:

an air filter for a furnace or an air conditioning unit; and a one-piece whistle device having a restricted longitudinal cavity with an upper hollow circular flange, a cylindrical tubular body portion, and a truncated cone shaped nozzle portion consisting of a corrugated surface decreasing in radius and adapted to securely remain in the air filter under an airflow, the corrugated nozzle portion can be shortened to adjust the airflow tolerance of the whistle;

whereby the whistle emits a warning sound by the increased airflow through the restricted cavity when the air filter becomes overloaded with dirt and dust.

2. The dirty filter indicator device and an air filter combination according to claim 1, including a roof having three legs and a diameter coextensive with the diameter of the hollow circular flange.

3. The dirty filter indicator device and an air filter combination according to claim 1, wherein the longitudinal cavity extends at least one-half the distance into the hollow flange portion.

4. The dirty filter indicator device and an air filter combination according to claim 1, wherein the device is molded as one piece from recycled plastic.

* * * * *